(12) United States Patent
Padhye et al.

(10) Patent No.: US 11,687,519 B2
(45) Date of Patent: Jun. 27, 2023

(54) ENSURING AVAILABILITY AND INTEGRITY OF A DATABASE ACROSS GEOGRAPHICAL REGIONS

(71) Applicant: T-Mobile USA, Inc., Bellevue, WA (US)

(72) Inventors: Rahul Padhye, Sammamish, WA (US); Anand Ganapathy, Bellevue, WA (US); Sadique Ahmad, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 156 days.

(21) Appl. No.: 17/400,092

(22) Filed: Aug. 11, 2021

(65) Prior Publication Data

US 2023/0049139 A1 Feb. 16, 2023

(51) Int. Cl.
*G06F 16/23* (2019.01)
*G06F 16/29* (2019.01)

(52) U.S. Cl.
CPC ...... *G06F 16/2365* (2019.01); *G06F 16/2379* (2019.01); *G06F 16/29* (2019.01)

(58) Field of Classification Search
None
See application file for complete search history.

(56) References Cited

U.S. PATENT DOCUMENTS

| | | |
|---|---|---|
| 7,083,092 B2 | 8/2006 | Nakamura |
| 7,461,030 B2 | 12/2008 | Hibler et al. |
| 7,496,541 B2 | 2/2009 | Hibler et al. |
| 7,496,542 B2 | 2/2009 | Hibler et al. |
| 7,505,942 B2 | 3/2009 | Hibler et al. |
| 7,509,293 B2 | 3/2009 | Hibler et al. |
| 7,542,923 B2 | 6/2009 | Waldman |
| 7,617,125 B1 | 11/2009 | Light et al. |
| 7,788,141 B1 | 8/2010 | Sim |
| 7,797,197 B2 | 9/2010 | Kumar et al. |
| 7,850,073 B1 | 12/2010 | Ramachandran et al. |
| 7,877,267 B2 | 1/2011 | Sheppard et al. |

(Continued)

FOREIGN PATENT DOCUMENTS

| | | |
|---|---|---|
| CN | 1378664 A | 11/2002 |
| CN | 101194257 A | 6/2008 |

(Continued)

*Primary Examiner* — Scott A. Waldron
(74) *Attorney, Agent, or Firm* — Perkins Coie LLP

(57) ABSTRACT

A first stack running on a processor receives the transaction data, reference data, and context data. The reference data is independent of the transaction and of a user. The context data is associated with the user but is independent of the transaction. The first stack strips the transaction of derivable data to obtain stripped data. The derivable data includes data that can be derived from the stripped data, the context data, and the reference data. The derivable data can stream the stripped data to a global database available and redundant across multiple geographical regions. After the first stack fails, a second stack can resume the transaction by retrieving the stripped data from the global database, and retrieving the context data, and the reference data. The second stack can recreate the transaction data based on the stripped data, the context data, and the reference data, and can resume the transaction.

20 Claims, 6 Drawing Sheets

(56) References Cited

U.S. PATENT DOCUMENTS

| | | | |
|---|---|---|---|
| 7,890,367 B2 | 2/2011 | Ariff et al. | |
| 8,200,260 B2 | 6/2012 | Rouse et al. | |
| 8,209,229 B1 | 6/2012 | Weiss et al. | |
| 8,219,465 B2 | 7/2012 | Aliabadi et al. | |
| 8,332,406 B2 | 12/2012 | Donaldson | |
| 8,762,258 B2 | 6/2014 | Hansen | |
| 8,781,965 B2 | 7/2014 | Uster | |
| 9,412,117 B2 | 8/2016 | Hansen | |
| 9,418,371 B2 | 8/2016 | Hansen | |
| 9,576,296 B2 | 2/2017 | Hansen | |
| 9,584,836 B2 | 2/2017 | Fei et al. | |
| 9,600,839 B2 | 3/2017 | Caiman et al. | |
| 9,620,111 B1 | 4/2017 | Bell et al. | |
| 9,754,244 B2 | 9/2017 | Hansen | |
| 9,773,212 B2 | 9/2017 | Hammad | |
| 9,811,810 B1 | 11/2017 | Ranganath et al. | |
| 9,818,153 B1 | 11/2017 | Nickel | |
| 9,904,913 B2 | 2/2018 | Hansen | |
| 9,911,290 B1 | 3/2018 | Zalewski et al. | |
| 10,262,307 B2 | 4/2019 | Hansen | |
| 10,332,419 B2 | 6/2019 | Prakash et al. | |
| 10,467,645 B2 | 11/2019 | Wang et al. | |
| 10,572,892 B2 | 2/2020 | Wang et al. | |
| 10,685,384 B2 | 6/2020 | Kemp et al. | |
| 10,796,276 B1 | 10/2020 | Singh et al. | |
| 10,817,893 B2 | 10/2020 | Benjamin | |
| 10,825,074 B1 | 11/2020 | Edwards et al. | |
| 10,867,317 B2 | 12/2020 | Ladds et al. | |
| 10,885,047 B2 | 1/2021 | Mozes et al. | |
| 10,891,683 B2 | 1/2021 | Harmon et al. | |
| 11,017,403 B2 | 5/2021 | Allbright et al. | |
| 11,055,790 B2 | 7/2021 | Unnerstall | |
| 2003/0208442 A1 | 11/2003 | Cockrill et al. | |
| 2004/0162740 A1 | 8/2004 | Ericsson et al. | |
| 2005/0044014 A1 | 2/2005 | Tilis et al. | |
| 2005/0177507 A1 | 8/2005 | Bandych et al. | |
| 2006/0015419 A1 | 1/2006 | Graf et al. | |
| 2006/0026014 A1 | 2/2006 | Bolduc et al. | |
| 2007/0150352 A1 | 6/2007 | Kelly-frank et al. | |
| 2007/0192222 A1 | 8/2007 | Mika et al. | |
| 2008/0162590 A1 | 7/2008 | Kundu et al. | |
| 2008/0167944 A1 | 7/2008 | Keithley et al. | |
| 2009/0037294 A1 | 2/2009 | Malhotra | |
| 2009/0281890 A1 | 11/2009 | Aliabadi et al. | |
| 2010/0055554 A1 | 3/2010 | Lanford | |
| 2010/0217688 A1 | 8/2010 | Pandurangan | |
| 2010/0332307 A1 | 12/2010 | Parento | |
| 2011/0078011 A1 | 3/2011 | Ariff et al. | |
| 2011/0093335 A1 | 4/2011 | Fordyce et al. | |
| 2012/0124496 A1 | 5/2012 | Rose et al. | |
| 2012/0158600 A1 | 6/2012 | Heyer | |
| 2012/0166334 A1 | 6/2012 | Kimberg et al. | |
| 2012/0203632 A1 | 8/2012 | Blum et al. | |
| 2012/0239481 A1 | 9/2012 | Yankovich et al. | |
| 2013/0024371 A1 | 1/2013 | Hariramani et al. | |
| 2013/0054332 A1 | 2/2013 | Ross et al. | |
| 2013/0060621 A1 | 3/2013 | Walker et al. | |
| 2014/0278901 A1 | 9/2014 | Hatch et al. | |
| 2014/0278902 A1 | 9/2014 | Hatch et al. | |
| 2014/0279190 A1 | 9/2014 | Severinghaus et al. | |
| 2015/0066687 A1 | 3/2015 | Blackhurst et al. | |
| 2017/0116599 A1 | 4/2017 | Gupta et al. | |
| 2017/0132681 A1 | 5/2017 | Modi et al. | |
| 2017/0148081 A1 | 5/2017 | Chauhan | |
| 2017/0178166 A1 | 6/2017 | Tiwary et al. | |
| 2017/0178219 A1 | 6/2017 | Vaidya | |
| 2017/0228768 A1 | 8/2017 | Saxena et al. | |
| 2017/0293982 A1 | 10/2017 | Gupta et al. | |
| 2018/0101874 A1 | 4/2018 | Laski | |
| 2019/0188679 A1 | 6/2019 | Khanwala | |
| 2019/0197529 A1 | 6/2019 | Nelms et al. | |
| 2019/0266916 A1 | 8/2019 | Prakash et al. | |
| 2020/0104865 A1 | 4/2020 | Bhasin | |
| 2020/0327589 A1 | 10/2020 | Greenberg et al. | |
| 2021/0019822 A1 | 1/2021 | Edwards et al. | |
| 2021/0081433 A1* | 3/2021 | Vig | G06F 16/2272 |
| 2021/0174314 A1 | 6/2021 | Raouda El-Balah | |

FOREIGN PATENT DOCUMENTS

| | | |
|---|---|---|
| CN | 108027935 A | 5/2018 |
| CN | 111344729 A | 6/2020 |
| EP | 0945812 A1 | 9/1999 |
| EP | 1285372 A1 | 2/2003 |
| EP | 1393269 A2 | 3/2004 |
| EP | 1630732 A1 | 3/2006 |
| EP | 1736945 A1 | 12/2006 |
| EP | 2083550 A1 | 7/2009 |
| EP | 2801065 A1 | 11/2014 |
| EP | 3292526 A1 | 3/2018 |
| EP | 3646294 A2 | 5/2020 |
| EP | 3651108 A1 | 5/2020 |
| EP | 3776294 A1 | 2/2021 |
| JP | 2000513854 A | 10/2000 |
| JP | 2008027454 A | 2/2008 |
| JP | 4347508 B2 | 7/2009 |
| JP | 5054670 B2 | 8/2012 |
| JP | 2014527252 A | 10/2014 |
| JP | 5771476 B2 | 7/2015 |
| JP | 6222679 B2 | 10/2017 |
| KR | 20030068553 A | 8/2003 |
| KR | 100444695 B1 | 8/2004 |
| KR | 100585306 B1 | 6/2006 |
| KR | 100644402 B1 | 11/2006 |
| KR | 20070017244 A | 2/2007 |
| KR | 20070114041 A | 11/2007 |
| KR | 100803942 B1 | 2/2008 |
| KR | 100804846 B1 | 2/2008 |
| KR | 20120015430 A | 2/2012 |
| KR | 20140088093 A | 7/2014 |
| KR | 20150092111 A | 8/2015 |
| WO | 9110969 A1 | 7/1991 |
| WO | 9415309 A1 | 7/1994 |
| WO | 9641286 A1 | 12/1996 |
| WO | 9942941 A1 | 8/1999 |
| WO | 0033221 A1 | 6/2000 |
| WO | 0060516 A2 | 10/2000 |
| WO | 0104852 A1 | 1/2001 |
| WO | 0106439 A1 | 1/2001 |
| WO | 0113216 A1 | 2/2001 |
| WO | 0116850 A2 | 3/2001 |
| WO | 0120514 A1 | 3/2001 |
| WO | 0154038 A1 | 7/2001 |
| WO | 0242954 A1 | 5/2002 |
| WO | 03005149 A2 | 1/2003 |
| WO | 03021510 A2 | 3/2003 |
| WO | 03025824 A1 | 3/2003 |
| WO | 03050741 A2 | 6/2003 |
| WO | 03054655 A2 | 7/2003 |
| WO | 03098496 A2 | 11/2003 |
| WO | 2004042536 A2 | 5/2004 |
| WO | 2005065346 A2 | 7/2005 |
| WO | 2006015054 A2 | 2/2006 |
| WO | 2006055269 A2 | 5/2006 |
| WO | 2006107776 A2 | 10/2006 |
| WO | 2006124154 A2 | 11/2006 |
| WO | 2007026212 A1 | 3/2007 |
| WO | 2007027641 A2 | 3/2007 |
| WO | 2007076434 A2 | 7/2007 |
| WO | 2007086947 A2 | 8/2007 |
| WO | 2007121298 A2 | 10/2007 |
| WO | 2008064000 A1 | 5/2008 |
| WO | 2010028210 A1 | 3/2010 |
| WO | 2010033081 A2 | 3/2010 |
| WO | 2010062598 A2 | 6/2010 |
| WO | 2010127282 A2 | 11/2010 |
| WO | 2010150229 A2 | 12/2010 |
| WO | 2011018755 A2 | 2/2011 |
| WO | 2011031450 A2 | 3/2011 |
| WO | 2011042615 A1 | 4/2011 |
| WO | 2011046469 A1 | 4/2011 |
| WO | 2011049754 A2 | 4/2011 |
| WO | 2011116297 A2 | 9/2011 |

(56) References Cited

FOREIGN PATENT DOCUMENTS

| | | |
|---|---|---|
| WO | 2012045154 A1 | 4/2012 |
| WO | 2012054650 A1 | 4/2012 |
| WO | 2012054786 A1 | 4/2012 |
| WO | 2012083359 A2 | 6/2012 |
| WO | 2012087291 A1 | 6/2012 |
| WO | 2012112822 A2 | 8/2012 |
| WO | 2012116125 A1 | 8/2012 |
| WO | 2012118870 A1 | 9/2012 |
| WO | 2013021287 A2 | 2/2013 |
| WO | 2013138112 A1 | 9/2013 |
| WO | 2013155055 A2 | 10/2013 |
| WO | 2014008471 A1 | 1/2014 |
| WO | 2014018133 A1 | 1/2014 |
| WO | 2014059142 A1 | 4/2014 |
| WO | 2014100588 A1 | 6/2014 |
| WO | 2014159432 A1 | 10/2014 |
| WO | 2015112108 A1 | 7/2015 |
| WO | 2016009168 A1 | 1/2016 |
| WO | 2016014997 A1 | 1/2016 |
| WO | 2016032766 A1 | 3/2016 |
| WO | 2017139042 A1 | 8/2017 |
| WO | 2018007828 A2 | 1/2018 |
| WO | 2019118088 A1 | 6/2019 |
| WO | 2019125611 A1 | 6/2019 |
| WO | 2020205254 A1 | 10/2020 |

* cited by examiner

ENSURING AVAILABILITY AND INTEGRITY OF A DATABASE ACROSS GEOGRAPHICAL REGIONS

BACKGROUND

Multi-primary replication is a method of database replication which allows data to be stored by a group of computers and updated by any member of the group. All members are responsive to client data queries. The multi-primary replication system is responsible for propagating the data modifications made by each member to the rest of the group and resolving any conflicts that might arise between concurrent changes made by different members. The problems with multi-primary replication are consistency, performance, and integrity.

Regarding consistency, most multi-primary replication systems are only loosely consistent, i.e., lazy and asynchronous, violating ACID (atomicity, consistency, isolation, durability) properties. In computer science, ACID is a set of properties of database transactions intended to guarantee data validity despite errors, power failures, and other mishaps. Regarding performance, multi-primary replication systems are complex and increase communication latency. Regarding integrity, issues such as conflict resolution can become intractable as the number of nodes involved rises and latency increases.

BRIEF DESCRIPTION OF THE DRAWINGS

Detailed descriptions of implementations of the present invention will be described and explained through the use of the accompanying drawings.

Figure 1:
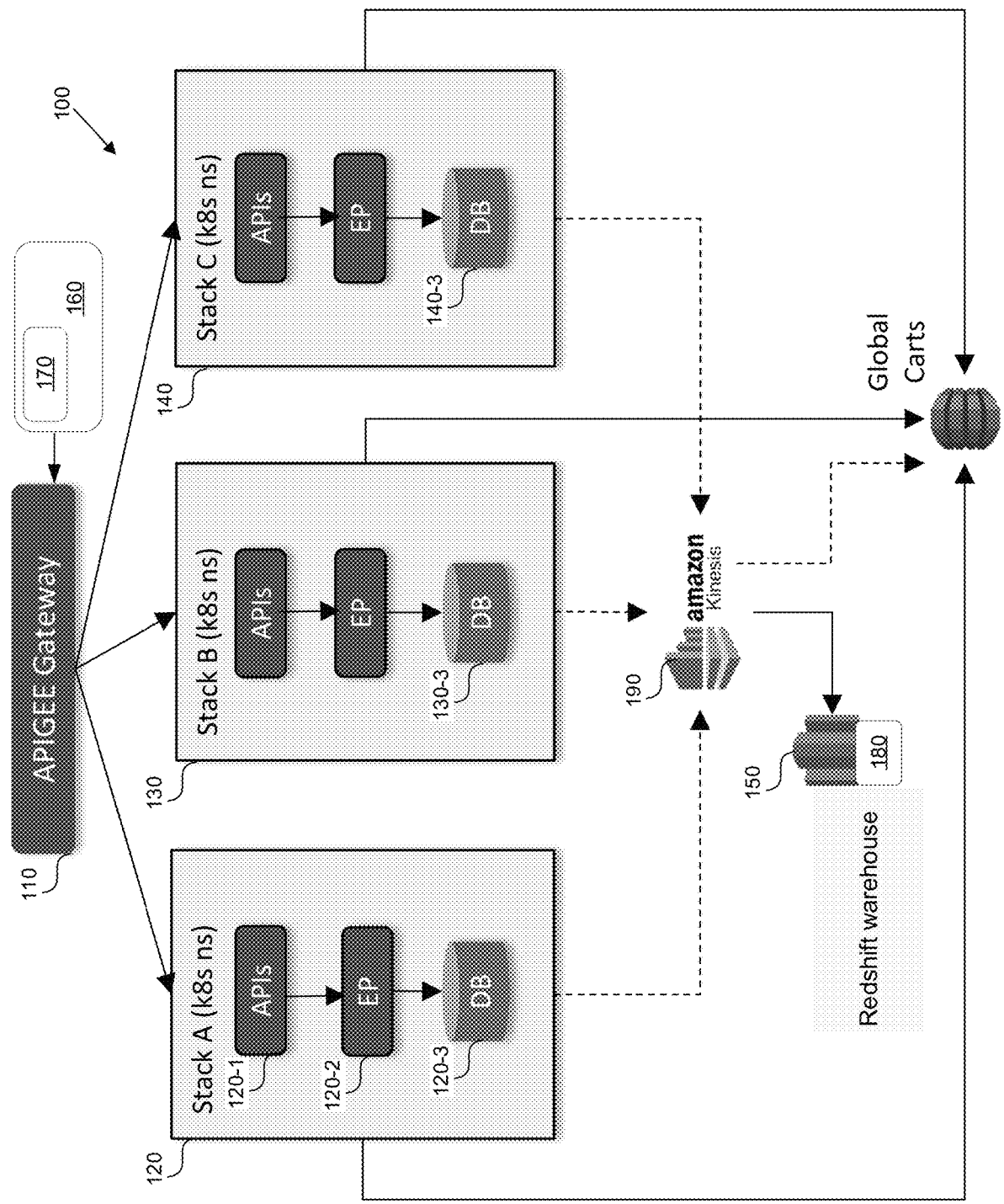
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method ensure availability and integrity of data associated with a transaction when a stack processing the transaction fails. A stack includes all the layers of code and data the system needs to provide a service to a user, such as completing the transaction. The transactions and associated transaction data can be distributed across multiple geographical regions. The transaction is an interaction between the user and the system which includes transaction data. The transaction can include user inputs, response from a seller, checking of inventory and locations, etc. A stack, e.g., stack A, can operate in a geographical region, such as the Pacific Northwest. Stack A can receive the data associated with the transaction from a user. The data can include an identification (ID) of a purchased item, and a quantity of the purchased item. Stack A can obtain additional data such as reference data and context data. The reference data is independent of the transaction and is independent of the user. The reference data can include tax code, a pricing category associated with the purchased item, and/or product specification associated with the purchased item. The context data is associated with the user and is independent of the transaction. The context data can include user billing information, a user score, a zip code associated with the user, and/or a number of subscriptions (ex. cellular lines, mobile internet or media services) associated with the user's account.

Stack A can dehydrate the transaction by stripping the transaction from derivable data to obtain dehydrated data. The derivable data can include data derivable from the dehydrated data, the context data, and the reference data, such as a price associated with the purchased item. The dehydrated data can include a purchased item, and a quantity of the purchased item. The derivable data can include a price associated with the purchased item. Stack A can stream the dehydrated data to a global database. The global database is available and redundant across the multiple geographical regions including the geographical region where the stack A is operating, such as the Pacific Northwest, and a different geographical region, such as the Midwest. The global database is available to stack A and stack B operating independently of stack A. Stack B can operate outside of the Pacific Northwest, such as the Pacific Southwest.

The system can obtain an indication that the stack A has failed. As a result, the system can transfer the transaction to stack B. To resume the transaction, stack B can retrieve the dehydrated data from the global database, and retrieve the context data and the reference data from their respective databases. Stack B can hydrate the dehydrated data by recreating the data associated with the transaction based on the dehydrated data, the context data, and the reference data. After recreating the data, stack B can resume the transaction, without any of data provided by the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Ensuring Availability and Integrity of a Database Across Geographical Regions

FIG. 1 shows multiple stacks interacting with a global database. The system 100 includes a gateway 110, multiple stacks 120, 130, 140, a streaming service 190, and a global database 150. The system 100 can be a part of a wireless telecommunication network providing cellular and data services to the user.

A stack includes all the layers of code 120-1, 120-2 (only two labeled for brevity) and data 120-3 that the system 100 needs to provide a service to a user. The layers of code can include the application programmer interface (API) 120-1 and the executable code 120-2.

A stack 120 can fail, and another stack 130, 140 may need to recreate the data up until the transaction has failed and to resume the transaction from the point of failure. Traditionally, to achieve that, the stacks 120, 130, 140 shared data among each other by duplicating data across databases available to each stack 120-3, 130-3, 140-3. In the disclosed system 100, stacks 120, 130, 140 do not share anything with any other stack 120, 130, 140. The system 100 can spin up a stack 120, 130, 140 and can communicate with the stack without any dependency with any other stack.

To recover from failure, the stack 120 continuously streams data, using the streaming service 190, in dehydrated form to the global database 150. When the stack 120 fails, any of the remaining functioning stacks 130, 140 can retrieve the dehydrated data 180 from the global database, rehydrate the data, and resume the transaction, as described in this application. To create the dehydrated data 180, the system breaks the data down into different categories including reference data, context data, and derivable data, as described in this application.

The streaming service 119 ensures that the data stored in the global database 150 is up-to-date. For example, when the stack 120, 130, 140 changes transaction data that is not derivable data, the streaming service 190 streams the new data to the global database 150.

The gateway 110 is a proxy that sits on top of every stack 120, 130, 140 and enables communication between the user and the system 100. The gateway 110 can be API gateway mirror or router. Every request 160 goes to the gateway 110. Each request 160 can have an authorization header 170, that uniquely identifies the customer transaction. Based on the authorization header 170, the gateway 110 can determine to which stack 120, 130, 140 to assign the request 160. The gateway can make the determination based any algorithm including a simple one such as modulo calculation. For example, if there are three stacks 120, 130, 140, the modulo calculation can be modulo 3. Consequently, each stack can receive one third of the traffic. As long as the header (or customer identifying transaction) doesn't change, the routing logic doesn't change; therefore, the request 160 always goes to the same stack, e.g., stack 120. If the authorization header 170 changes, (in other words a new transaction starts), the header of the request 160 is changed. In this case, the gateway 110 can assign the request to a different stack based on the modulo calculation.

As long as long as the authorization header 170 doesn't change and the stack 120 is up, the transaction starts and finishes in stack 120. If the authorization header 170 doesn't change but the stack 120 goes down, the gateway 110 assigns this authorization header 170 to a new stack, e.g., stack 130. Upon receiving the authorization header 170, stack 130 identifies that the authorization header is new to the stack 130. Consequently, the stack 130 gathers context data, applies the reference data and rehydrates the transaction data, as explained in this application, and resumes the transaction from the rehydrated transaction data. Using dehydration, rehydration, reference data, and context data, the system 100 guarantees that if the transaction works with stack 120, the transaction continues to work with stack 130. In other words, the transactional integrity is guaranteed.

The database 150 is a global database across multiple stacks 120, 130, 140. The database 150 can be Amazon Redshift, DynamoDB, MongoDB, etc. The database 150 stores dehydrated data 180 that is available to every stack 120, 130, 140.

The system 100 can adjust the traffic load to each stack 120, 130, 140. For example, the system can send 40% of all traffic to stack 120 and 60% of the traffic to stack 130. In addition, the system 100 can split the incoming transactions based on a configuration attribute such as consuming application or channel. A channel includes web, retail, care. For example, the web can be split 40/60% and across stacks 120, 130 but retail traffic can be split 90/10% across stacks 120, 130. In another example, the system 100 can dedicate a full stack 120, 130, 140 to a particular consumer or sales channel. In a third example, the system can split incoming transactions based on the application from which the transactions are coming.

In a fourth example, the system 100 can route transactions based on whether a stack 120, 130, 140 is being tested, also known as the canary release. For example, if stack 120 is being updated and/or tested for a new technology, the system 100 can split the incoming traffic 50/50% between stacks 130, 140. Once the stack 120 is ready for testing, the system can split the incoming traffic 10/45/45% between stacks 120, 130, 140, respectively. If the stack 120 is performing well, the system 100 can then adjust the split to 20/40/40%. If the stack 120 is not performing well, the system can adjust the split to 0/50/50%.

Figure 2:
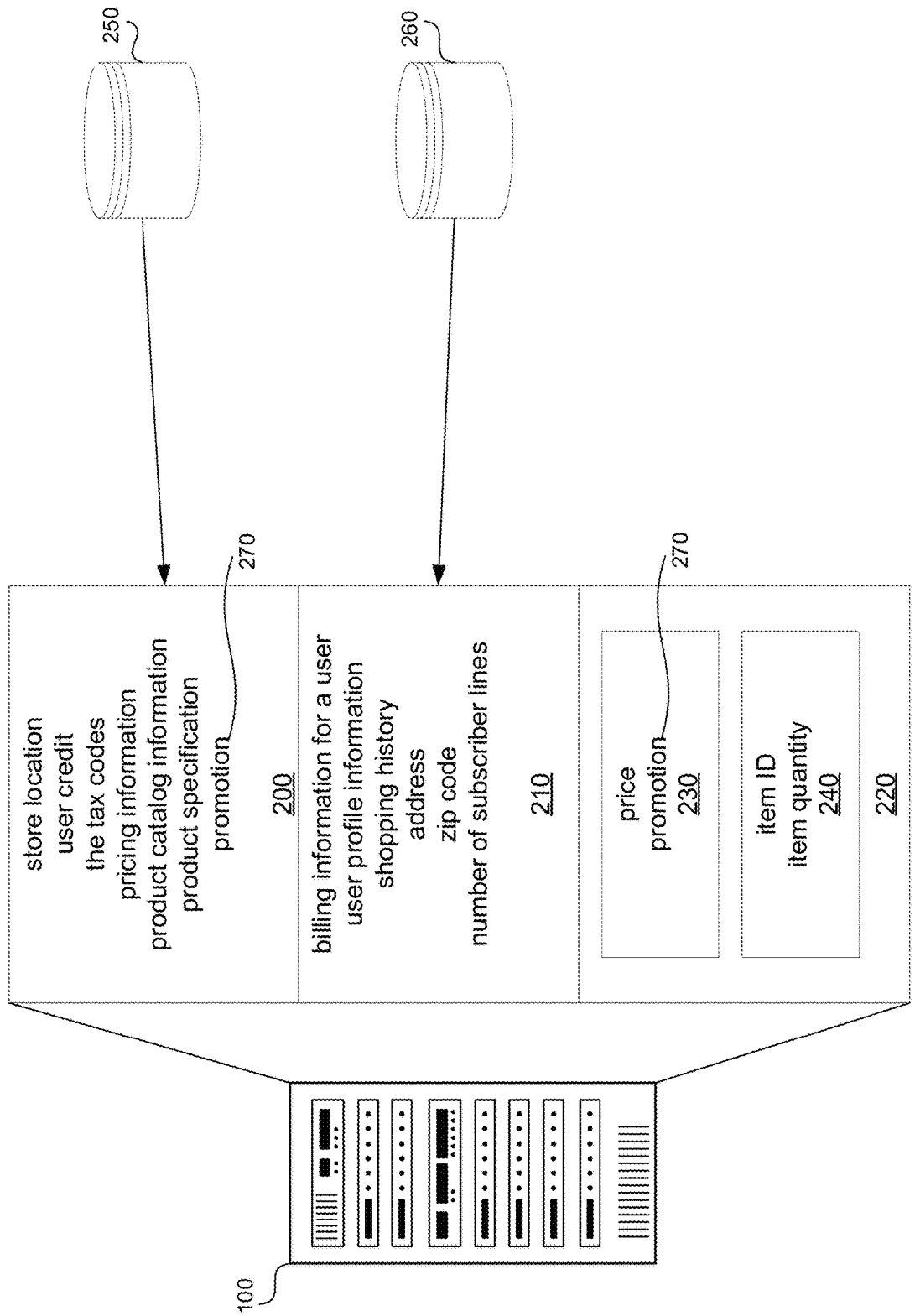
FIG. 2 shows the various data types that the system needs to obtain.

FIG. 2 shows the various data types that the system needs to obtain. The data is broken up into three categories: reference data 200, context data 210, and transaction data 220 which includes derivable data 230, and dehydrated data 240.

The reference data 200 includes information such as store location, user credit, tax codes, pricing information, product catalog information, product specification, promotions, etc. The reference data does not depend on the user performing the transaction and can be obtained from a third-party database 250 ahead of transaction and stored locally in a local database or in a local cache.

The context data 210 includes billing information for a user, user profile information, shopping history, address, zip code, number of subscriber lines, etc. When the user logs in, the system 100 needs the context data 210 including who the user is, where the user is, what kind of subscriptions the user has within the system 100, etc., so that the system 100 can offer the right products and plans to the user. The context data 210 depends on the user and can change with time. Specifically, the context data 210 can change from interaction to interaction.

The context data 210 can also include the user's shopping history and shopping behavior. For example, if the user is new, has no history with the system 100, and indicates that they want to buy a new plan, such as a subscription with a wireless telecommunication provider, the system 100 can request the user's zip code to check for availability of coverage in the user's area. The zip code becomes part of context data 210.

The system 100 can obtain the context data 210 from a third-party database 260 once the user is identified, such as when the user logs in. The database 260 and the database 250 can be the same database or can be different databases. The system 100 gathers the context data upon identifying the user, so that by the time the user is initiating the transaction, such as beginning to shop, the system 100 has already obtained the needed context data 210.

The final category of data is data associated with the transaction or transaction data 220 including the derivable data 230 and dehydrated data 240. The derivable data 230 can include product price and promotions. The dehydrated data 240 can include item identification (ID) in the digital shopping cart ("cart") and how many items in the cart. The transaction data 220 can be cart information, financial transaction information, healthcare transaction information, insurance transaction information, etc. The system 100 calculates the transaction data 220 in real time and/or obtains the transaction data 220 from the current transaction with the user. The system 100 does not obtain transaction data from a database.

The derivable data 230 can change with time based on context data 210 and reference data 200, such as price. The price and/or promotions can change tomorrow or next month. Consequently, the system calculates the price and/or promotions in real time. The dehydrated data 240 does not change based on context data 210 and reference data 200. For example, the items in the cart and how many items are in the cart do not change based on context data 210 and/or reference data 200.

When the system 100 dehydrates the transaction data 220, the system strips off the information that could change from interaction to interaction, such as pricing and/or promotions. The system 100 keeps the dehydrated data 240 such as the item ID, and quantity of the item. The item can be how many cell phone lines, e.g. plans, the user wants to purchase with the system 100.

The format of the dehydrated data 240 is independent of the format of the transaction data 220. For example, the data structure representing the transaction data 220 can change without affecting the data structure representing the dehydrated data 240. Consequently, if during a canary release, the stack 120 in FIG. 1, under testing, changes the data structure of the transaction data 220, and the stack 120 fails during testing, another stack 130 in FIG. 1 can retrieve the dehydrated data saved by stack 120 prior to failure, and can interpret the dehydrated data because the dehydrated data has not changed.

Promotion 270, contained in the transaction data, is also contained in the reference data 200. Promotions 270 are determined ahead of time and can be downloaded from a third-party database 250. However, there is a real-time component to calculate promotions 270 which depends on the attributes of the user, that is, context data 210.

For example, when the user indicates to the system 100 to show the items to the user, the system 100 shows the items that the user is eligible to buy. Further, the system 100 can determine if a promotion 270 is associated with the item. The promotion 270 can contain a qualifying condition that the user needs to satisfy. In a specific example, the promotion 270 can indicate that the user needs to have good credit history. The promotion can indicate that the user needs to have five lines with the wireless telecommunication provider, and if the user has five lines, the sixth line can be discounted. The system 100 consistently performs evaluation of promotions 270 because the promotions depend on context data 210 which can change with time. In a second specific example, during a previous transaction, the user had four lines; however, during the current transaction user has seven lines, showing that the system 100 needs to evaluate promotions constantly.

Figure 3:
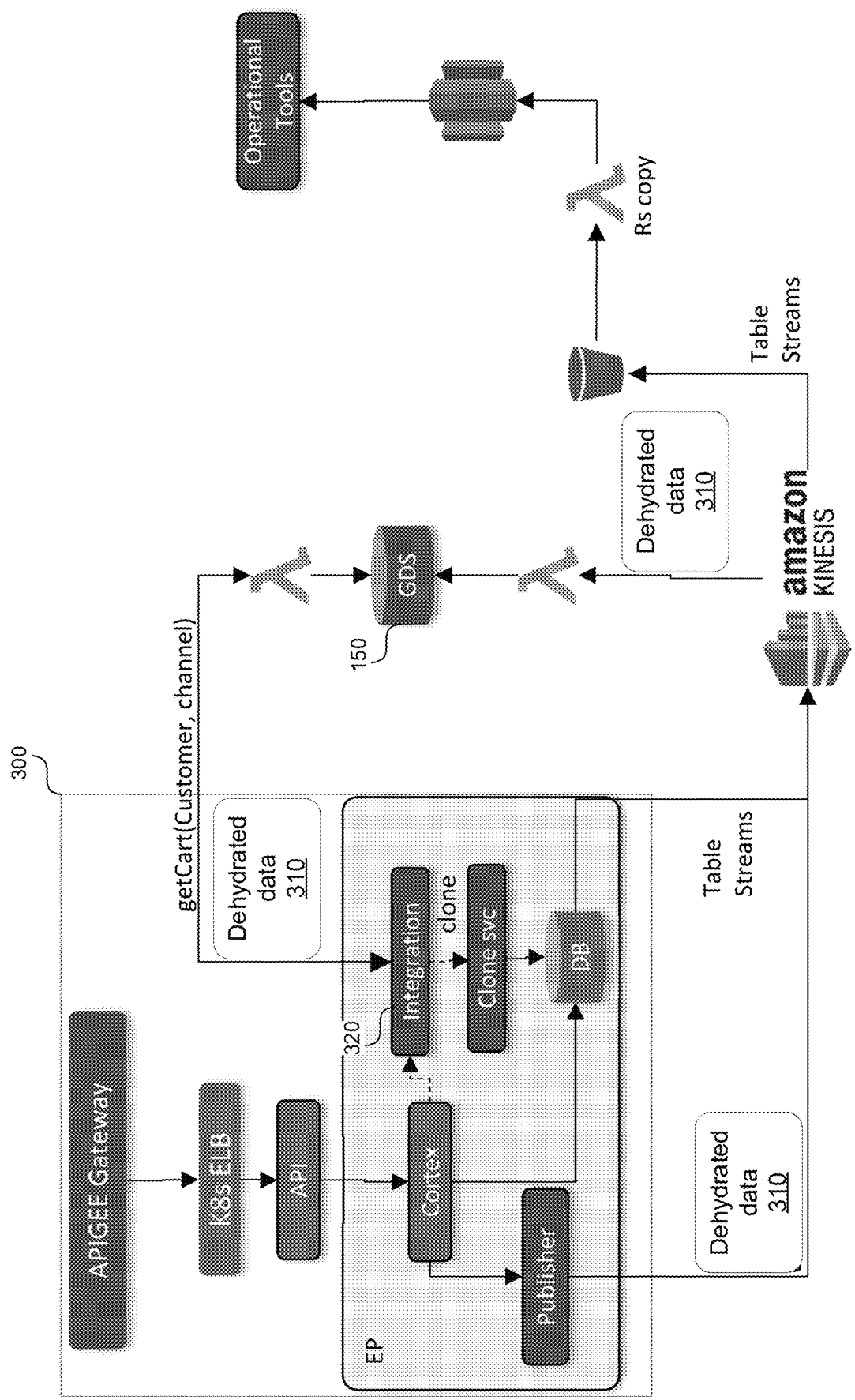
FIG. 3 shows the flow of dehydrated and rehydrated data.

FIG. 3 shows the flow of dehydrated and rehydrated data. A stack 300 can be the stack 120, 130, 140 in FIG. 1. The stack 300 can stream data received from a user into the global database 150. Prior to streaming the data received from the user, the stack 300 dehydrates the data to obtain dehydrated data 310. Streaming all the data ensures that the latest changes to the transaction data 220 in FIG. 2 are stored as fast as possible in the second global database 150, thus reducing the time window during which the failure of the stack 300 can cause loss of data.

The global database 150 is a key-value pair database. The key-value pair database 150 is available across geographical regions unlike the relational databases 120-3, 130-3, 140-3 in FIG. 1. The key-value pair database 150 is available across geographical regions, because the key-value pair database 150 is copied across multiple geographical regions. The copying of the key-value pair database 150 can be done because the key-value pair database 150 can be represented in a single file such as a JSON file. If a catastrophic event occurs in one region disabling all the databases 150 that region, another region has a copy and can provide the necessary data. The relational databases 120-3, 130-3, 140-3 are not available across geographical regions because copying of relational databases and ensuring synchronization among multiple copies is difficult due to the nature of the relational database, such as preserving complex, hierarchical relations in the relational database. The key-value pair database 150, because it is easy to copy across multiple geographical regions, ensures availability, while the relational databases 120-3, 130-3, 140-3 ensure integrity of the data.

The global database 150 stores the dehydrated data 310. The dehydrated data 310 has a unique ID in the database 150. The unique ID can be based on the user ID such as the user phone number, a channel, and/or a segment. A channel includes web, retail, care. A segment can include one or more channels and describes a relationship between two parties engaged over segment. The segment can be business to customer or business to business.

For example, if the ID is based on a user and a channel, when the user is engaged in shopping through web interface, the ID can include the user phone number and the ID of the channel such as "0001" for the web interface. If the stack carrying the transaction fails, the user can go to a brick-and-mortar store. The brick-and-mortar store can retrieve the information of the failed transaction using the customer ID and the ID of the channel. Consequently, the customer can finish the transaction started in one channel on another channel. To retrieve the information of the failed transaction, the stack 300, different from the stack carrying the web interface transaction, can obtain dehydrated data 310. The stack 300 can then rehydrate the data in step 320 and can continue the failed transaction. In a different example, the ID can be based on the user ID, and the stack 300 can retrieve the dehydrated data 310 based on solely the user ID without the channel information.

Figure 4:
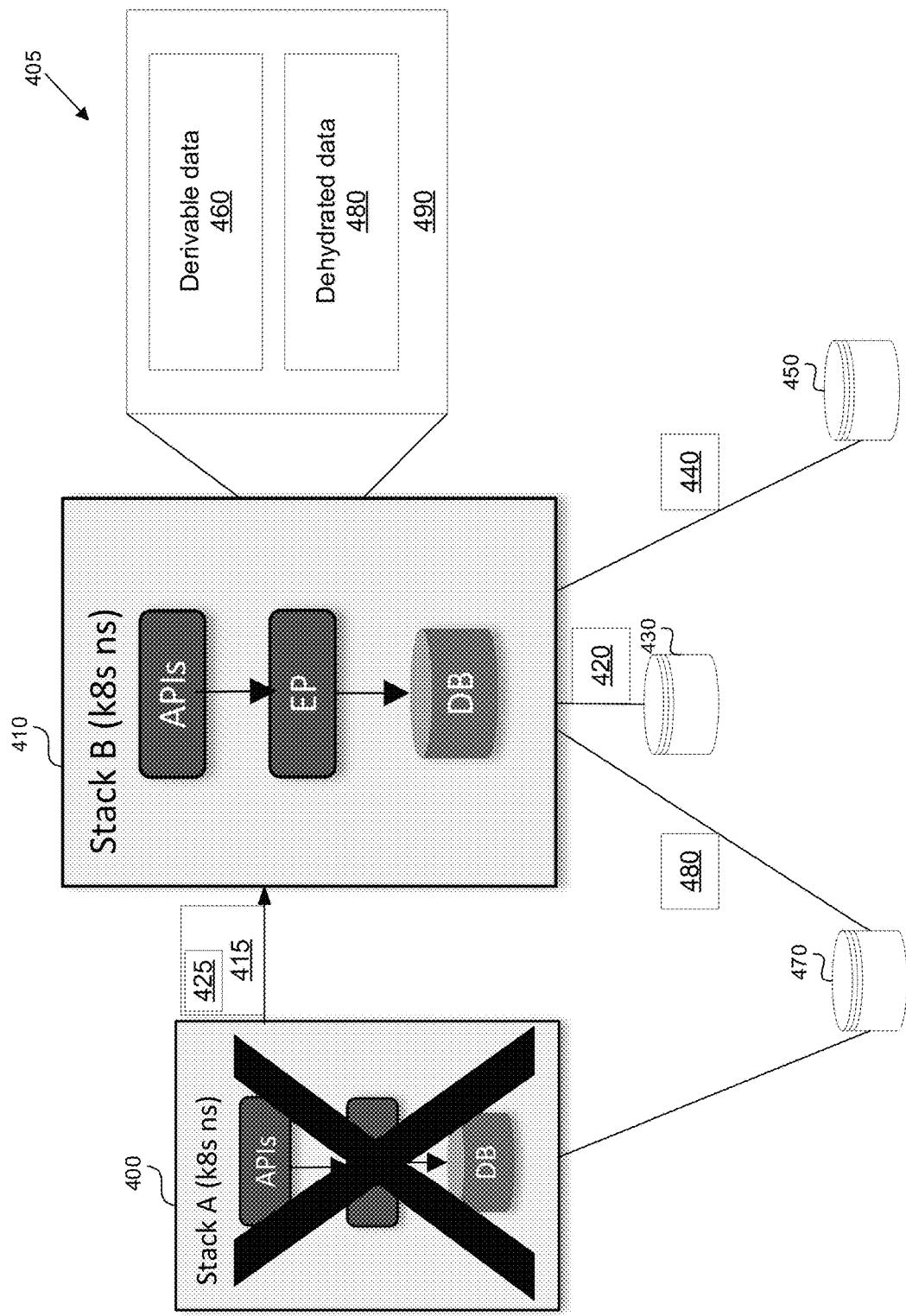
FIG. 4 shows the steps performed when a stack is lost.

FIG. 4 shows the steps performed when a stack is lost. If a stack 400 is lost, the stack 410 can take over the transaction. Stacks 400, 410 can be the stacks 120, 130, 140 in FIG. 1. The stack 410 can be in a different geographical region than the stack 400. Upon taking over the transaction, the stack 410 obtains the reference data 420. Because the reference data 420 is not user specific, the system 405 can store the reference data in a local storage area 430, such as a cache or a local database. Further, the stack 410 obtains context data 440 from a third-party database 450. The context data 440 depends on the user. The stack 410 needs to know the user ID 425 to know which context data to retrieve. The user's authorization token 415 contains the user ID 425 and other identifying information. The authorization token 415 is valid during the user's interaction and is validated upon every request. When the stack 400 fails, the system 405 can send the initial request to the stack 410. The initial request to the stack 410 contains the authorization token 415. The stack 410 can extract user ID 425 from the authorization token 415, identify the user, and use the user ID 425 to obtain the appropriate context data.

Finally, the stack 410 obtains a portion of transaction data 490 from the global database 470 which stores dehydrated data streamed by stacks 400, 410. The stack 410 obtains the dehydrated data 480, which can contain information such as item ID and quantity of items. The stack 410 then rehydrates the dehydrated data 480 using reference data 420 and context data 440. To rehydrate the dehydrated data 480, the stack 410 can compute the derivable data 460, such as price and/or promotions of each item in the cart, and the total price of the cart. Upon rehydrating the dehydrated data 480, the cart obtains transaction data, e.g., rehydrated data, 490. Rehydrated data 490 includes pricing information.

The user can continue shopping using rehydrated data 490. As the user modifies the contents of rehydrated data 490, the stack 410 continues to stream the modifications to the global database 470 because streaming reduces a window of time during which a failure of the stack 410 can cause loss of user modifications. If the stack 410 fails, another stack can take over the transaction and perform the steps described above.

Figure 5:
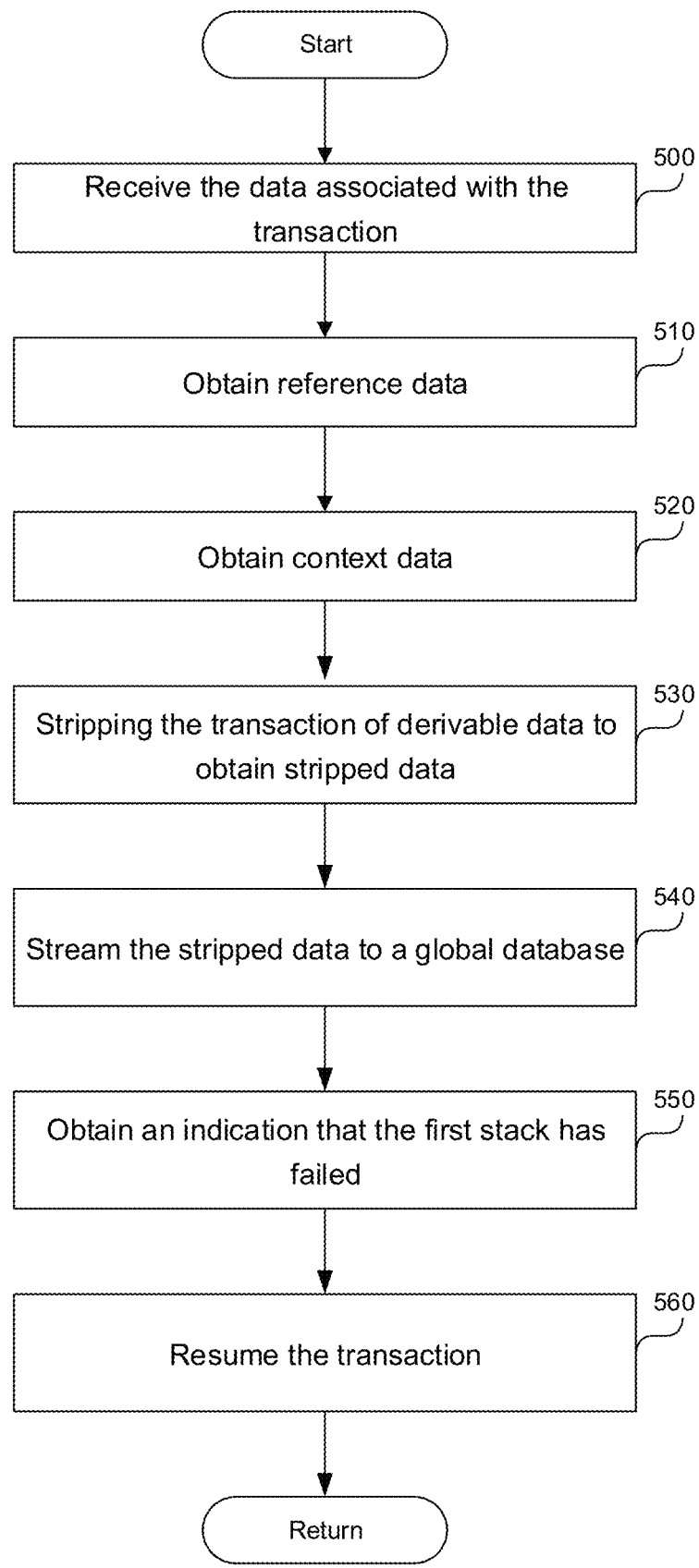
FIG. 5 is a flowchart that illustrates a process to ensure availability and integrity of data associated with a transaction.

FIG. 5 is a flowchart that illustrates a process to ensure availability and integrity of data associated with a transaction. In step 500, a hardware or a software processor executing the instructions described in this application can be associated with a first stack and/or a second stack. The first stack can operate in one geographical region, and the second stack can operate in a different geographical region. For example, the first stack can operate in Portland, and the second stack can operate in Phoenix. The processor can receive the data associated with the transaction, e.g., transaction data, from a user. Transaction data can include an identification (ID) of an item, and a quantity of the item. The item can be a purchased item.

In step 510, the processor can obtain reference data. The reference data is independent of the transaction, and the reference data is independent of the user. The reference data includes tax code, a pricing category associated with the item, a product specification associated with the item, and identification of a channel associated with the transaction. The channel associated with this transaction describes the medium through which the transaction is completed. The medium through which the transaction is completed can influence the price. For example, a product sold online can have a different price than a product sold in a brick-and-mortar store.

In step 520, the processor can obtain context data. The context data is associated with the user, and the context data is independent of the current transaction. The context data can include user billing, a user score, a zip code associated with the user, and a number of cellular lines associated with the user's account.

In step 530, the processor can dehydrate, e.g., strip, the transaction from derivable data to obtain dehydrated data, e.g., stripped data. The processor can update the transaction data, as the user makes changes, and the processor can strip the transaction data as the updates to the transaction are happening. The derivable data includes data that can be derived from dehydrated data, the context data, and the reference data. The dehydrated data can include a purchased item, and a quantity of the purchased item. The derivable data can include a price associated with the purchased item.

In step 540, the processor can stream the stripped data to a global database. Streaming of updates to the transaction data can happen with a latency of up to a few hundred milliseconds thus minimizing data lost if the stack doing the streaming fails. The global database is a key-value pair database that is available and redundant across multiple geographical regions. The global database is available to both the first stack and the second stack.

In step 550, the processor can obtain an indication that the first stack has failed. In step 560, the processor can resume the transaction using the second stack. The second stack can retrieve the stripped data from the global database, and also retrieve the context data and the reference data. The second stack can rehydrate, e.g., recreate, the transaction data based on the dehydrated data, e.g., stripped data, the context data, and the reference data. In step 570, upon recreating the transaction, the processor can resume the transaction.

To recreate the transaction data, the processor can retrieve the reference data including a promotion associated with the purchased item. The promotion can include a criterion that needs to be satisfied for the promotion to apply. The processor can retrieve the context data such as a user data including data relevant to the criterion. The processor can retrieve the stripped data including a purchased item and a quantity of the purchased item. The processor can determine a price associated with the purchased item based on the promotion, the user data, the purchased item, and the quantity of the purchased item. The processor can add the determined price to the transaction data.

The processor can use multiple stacks to test a canary release of a stack. A canary release is a deployment pattern that enables the processor to roll out new code/features to a subset of users as an initial test, by adjusting the number of transactions handled by the stack being tested. The processor can create multiple stacks including the first stack and the second stack. Stacks can be associated with channels or segments. Each stack among the multiple stacks is configured to process a portion of a total number of transactions. The processor can assign a portion of the total number of transactions associated with a third stack among the multiple stacks to zero, meaning that the processor takes the third stack offline. The processor can change the third stack by, for example, upgrading the coding of the third stack or changing the data structure of the transaction data that the third stack uses. Upon changing the third stack, the processor can increase the portion of the total number of transactions processed by the third stack. The increase is positively correlated to a performance of the third stack. If the third stack after the change can handle the transactions, the processor can increase the amount of transactions allocated to the third stack.

The processor can assign incoming transactions to various stacks using a modulo function. The processor can create multiple stacks including the first stack and the second stack. Each stack among the multiple stacks is configured to process a portion of a total number of transactions. The processor can obtain a numerical identifier associated with the transaction among the total number of transactions and can perform a modulo operation based on the numerical identifier. A parameter associated with the modulo operation can be configured to distribute the total number of transactions to each stack according to a portion of the total number of transactions assigned to each stack. For example, if there are 10 stacks, and the transactions are distributed equally among the 10 stacks, the modulo operation can be modulo 10. As long as the numerical identifier does not change, the modulo operation guarantees that the same transaction will go to the same stack.

If one of the 10 stacks fails, the modulo operations can be combined. The processor can obtain the numerical identifier of the transactions that went to the failed stack and can perform modulo 9 (the remaining number of stacks) operation of the numerical identifier to evenly distribute the transactions among the functioning stacks.

The processor can create a unique identifier for the dehydrated data stored in the global database. The processor can obtain an identifier (ID) associated with the user, such as the phone number. The processor can also combine the ID associated with the user with the ID of a channel or a segment. The processor can generate a globally unique ID associated with the stripped data based on the ID associated with the user. Finally, the processor can associate the stripped data in the global database with the globally unique ID.

Computer System

Figure 6:
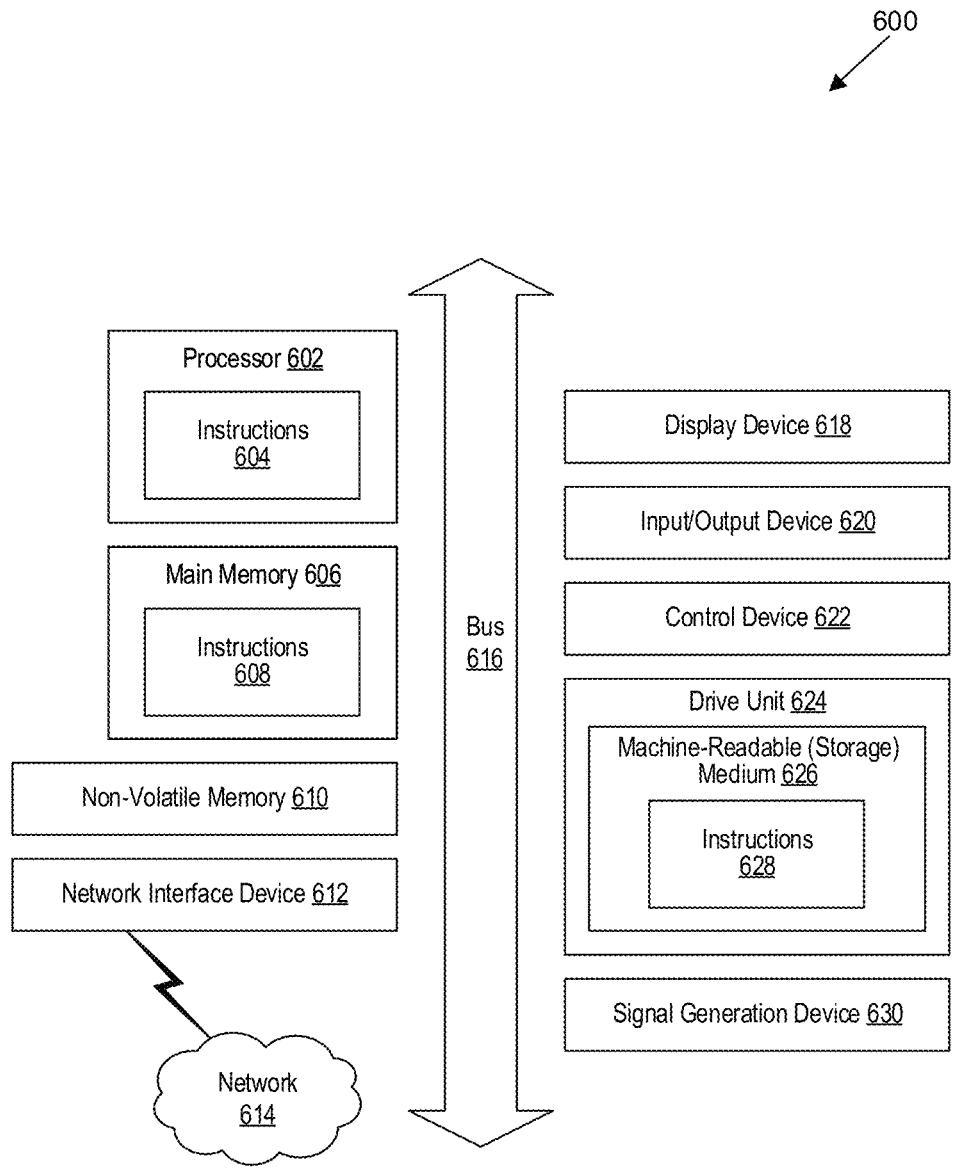
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems, or it can include one or more cloud components in one or more networks. Where appropriate, one or more computer systems 600 can perform operations in real time, near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable (storage) media, machine-readable media, or computer-readable media include recordable-type media such as volatile and non-volatile memory devices 610, removable flash memory, hard disk drives, optical discs, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or can include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions to ensure availability and integrity of data associated with a transaction across multiple geographical regions, which, when executed by at least one data processor of a system, cause the system to:
   receive, by a first stack operating in a first geographical region, the data associated with the transaction from a user,
      wherein the data includes an identification (ID) of an item, and a quantity of the item;
   obtain reference data,
      wherein the reference data is independent of the data associated with the transaction, and
      wherein the reference data is independent of the user;
   obtain context data,
      wherein the context data is associated with the user, and
      wherein the context data is independent of the data associated with the transaction;
   dehydrate the data associated with the transaction by stripping the data associated with the transaction of derivable data to obtain dehydrated data,
      wherein the derivable data comprises data that can be derived from the dehydrated data, the context data, and the reference data, and
      wherein the derivable data comprises a price associated with the item;
   stream the dehydrated data to a global database,
      wherein the global database is available and redundant across the multiple geographical regions including the first geographical region and a second geographical region, and
      wherein the global database is available to the first stack operating in the first geographical region and a second stack operating in the second geographical region;
   obtain an indication that the first stack operating in the first geographical region has failed; and,
   resume the transaction by the second stack operating in the second geographical region by:
      retrieving, by the second stack operating in the second geographical region, the dehydrated data from the global database;
      retrieving the context data and the reference data;
      hydrating the dehydrated data by recreating the data associated with the transaction based on the dehydrated data, the context data, and the reference data; and
      resuming the transaction.

2. The computer-readable storage medium of claim 1, further comprising the instructions to:
   create multiple stacks,
      wherein the multiple stacks include the first stack and the second stack, and
      wherein each stack among the multiple stacks is configured to process a portion of a total number of transactions;
   assign a portion of the total number of transactions associated with a third stack among the multiple stacks to zero;

change the third stack; and
upon changing the third stack, increase the portion of the total number of transactions associated with the third stack,
wherein the increase is positively correlated to a performance of the third stack.

3. The computer-readable storage medium of claim 1, further comprising the instructions to:
create multiple stacks,
wherein the multiple stacks include the first stack and the second stack, and
wherein each stack among the multiple stacks is configured to process a portion of a total number of transactions;
obtain a numerical identifier associated with the transaction among the total number of transactions; and
perform a modulo operation based on the numerical identifier,
wherein a parameter associated with the modulo operation is configured to distribute the total number of transactions to each stack according to the portion of the total number of transactions assigned to the each stack.

4. The computer-readable storage medium of claim 1, further comprising the instructions to:
obtain an identifier (ID) associated with the user and an ID of a channel,
wherein the channel describes a medium associated with the transaction;
generate a globally unique ID associated with the dehydrated data based on the ID associated with the user and the ID associated with the channel; and
associate the dehydrated data in the global database with the globally unique ID.

5. The computer-readable storage medium of claim 1, the instructions to hydrate the dehydrated data further comprising the instructions to:
retrieve the reference data including a promotion associated with the item,
wherein the promotion includes a criterion that needs to be satisfied for the promotion to apply;
retrieve the context data comprising a user data including data relevant to the criterion;
retrieve the dehydrated data including the item and the quantity of the item; and
determine the price associated with the item based on the promotion, the user data, the item, and the quantity of the item.

6. The computer-readable storage medium of claim 1, the reference data comprising a tax code, a pricing category associated with the item, product specification associated with the item, and identification of a channel associated with the transaction.

7. The computer-readable storage medium of claim 1, the context data comprising a user billing, a user score, a zip code associated with the user, and a number of cellular lines associated with the user's account.

8. A system comprising:
at least one hardware processor; and
at least one non-transitory memory storing instructions, which, when executed by the at least one hardware processor, cause the system to:
receive, by a first stack, data associated with a transaction;
obtain reference data,
wherein the reference data is independent of the transaction, and
wherein the reference data is independent of a user;
obtain context data,
wherein the context data is associated with the user, and
wherein the context data is independent of the transaction;
strip the transaction of derivable data to obtain stripped data,
wherein the derivable data comprises data that can be derived from the stripped data, the context data, and the reference data;
stream the stripped data to a global database,
wherein the global database is available and redundant across multiple geographical regions, and
wherein the global database is available to the first stack;
obtain an indication that the first stack has failed;
resume, by a second stack, the transaction by:
retrieving, by the second stack, the stripped data from the global database;
retrieving the context data, and the reference data;
recreating the data associated with the transaction based on the stripped data, the context data, and the reference data; and
resuming the transaction.

9. The system of claim 8, further comprising the instructions to:
create multiple stacks,
wherein the multiple stacks include the first stack and the second stack, and
wherein each stack among the multiple stacks is configured to process a portion of a total number of transactions;
assign a portion of the total number of transactions associated with a third stack among the multiple stacks to zero;
change the third stack; and
upon changing the third stack, increase the portion of the total number of transactions associated with the third stack,
wherein the increase is positively correlated to a performance of the third stack.

10. The system of claim 8, further comprising the instructions to:
create multiple stacks,
wherein the multiple stacks include the first stack and the second stack, and
wherein each stack among the multiple stacks is configured to process a portion of a total number of transactions;
obtain a numerical identifier associated with the transaction among the total number of transactions; and
perform a modulo operation based on the numerical identifier,
wherein a parameter associated with the modulo operation is configured to distribute the total number of transactions to each stack according to the portion of the total number of transactions assigned to each stack.

11. The system of claim 8, further comprising the instructions to:
obtain an identifier (ID) associated with the user;
generate a globally unique ID associated with the stripped data based on the ID associated with the user; and
associate the stripped data in the global database with the globally unique ID.

12. The system of claim 8, the instructions to recreate the data associated with the transaction further comprising the instructions to:
- retrieve the reference data including a promotion associated with an item,
  - wherein the promotion includes a criterion that needs to be satisfied for the promotion to apply;
- retrieve the context data comprising a user data including data relevant to the criterion;
- retrieve the stripped data including the item and a quantity of the item; and
- determine a price associated with the item based on the promotion, the user data, the item, and the quantity of the item.

13. The system of claim 8, the reference data comprising a tax code, a pricing category associated with an item, a product specification associated with the item, and an identification of a channel associated with the transaction.

14. The system of claim 8, the context data comprising a user billing, a user score, a zip code associated with the user, and a number of cellular lines associated with the user's account.

15. The system of claim 8, wherein the stripped data includes an item, and a quantity of the item, and wherein the derivable data comprises a price associated with the item.

16. A method comprising:
- receiving, by a first stack, data associated with a transaction;
- obtaining reference data,
  - wherein the reference data is independent of the transaction, and
  - wherein the reference data is independent of a user;
- obtaining context data,
  - wherein the context data is associated with the user, and
  - wherein the context data is independent of the transaction;
- stripping the transaction of derivable data to obtain stripped data,
  - wherein the derivable data comprises data that can be derived from the stripped data, the context data, and the reference data;
- streaming the stripped data to a global database,
  - wherein the global database is available and redundant across multiple geographical regions, and
  - wherein the global database is available to the first stack;
- obtaining an indication that the first stack has failed;
- resuming, by a second stack, the transaction by:
  - retrieving, by the second stack, the stripped data from the global database;
  - retrieving the context data, and the reference data;
  - recreating the data associated with the transaction based on the stripped data, the context data, and the reference data; and
  - resuming the transaction.

17. The method of claim 16, further comprising:
- creating multiple stacks,
  - wherein the multiple stacks include the first stack and the second stack, and
  - wherein each stack among the multiple stacks is configured to process a portion of a total number of transactions;
- assigning a portion of the total number of transactions associated with a third stack among the multiple stacks to zero;
- changing the third stack; and
- upon changing the third stack, increasing the portion of the total number of transactions associated with the third stack,
  - wherein the increase is positively correlated to a performance of the third stack.

18. The method of claim 16, further comprising:
- creating multiple stacks,
  - wherein the multiple stacks include the first stack and the second stack, and
  - wherein each stack among the multiple stacks is configured to process a portion of a total number of transactions;
- obtaining a numerical identifier associated with the transaction among the total number of transactions; and
- performing a modulo operation based on the numerical identifier,
  - wherein a parameter associated with the modulo operation is configured to distribute the total number of transactions to each stack according to the portion of the total number of transactions assigned to each stack.

19. The method of claim 16, further comprising:
- obtaining an identifier (ID) associated with the user;
- generating a globally unique ID associated with the stripped data based on the ID associated with the user; and
- associating the stripped data in the global database with the globally unique ID.

20. The method of claim 16, wherein recreating the data associated with the transaction further comprises:
- retrieving the reference data including a promotion associated with an item,
  - wherein the promotion includes a criterion that needs to be satisfied for the promotion to apply;
- retrieving the context data comprising a user data including data relevant to the criterion;
- retrieving the stripped data including the item and a quantity of the item; and
- determining a price associated with the item based on the promotion, the user data, the item, and the quantity of the item.

* * * * *